United States Patent
Stark

(10) Patent No.: US 9,662,722 B2
(45) Date of Patent: May 30, 2017

(54) CUTTING INSERT AND TOOL FOR MACHINING A WORKPIECE

(71) Applicant: Hartmetall-Werkzeugfabrik Paul Horn GmbH, Tuebingen (DE)

(72) Inventor: Christian Stark, Rottenburg-Hemmendorf (DE)

(73) Assignee: Hartmetall-Werkzeugfabrik Paul Horn GmbH, Tuebingen (DE)

( * ) Notice: Subject to any disclaimer, the term of this patent is extended or adjusted under 35 U.S.C. 154(b) by 204 days.

(21) Appl. No.: 14/656,923

(22) Filed: Mar. 13, 2015

(65) Prior Publication Data

US 2015/0183034 A1 Jul. 2, 2015

Related U.S. Application Data

(63) Continuation of application No. PCT/EP2013/060766, filed on May 24, 2013.

(30) Foreign Application Priority Data

Sep. 18, 2012 (DE) .......................... 10 2012 108 751

(51) Int. Cl.
  *B23C 5/20* (2006.01)
  *B23C 5/10* (2006.01)

(52) U.S. Cl.
  CPC .............. *B23C 5/207* (2013.01); *B23C 5/109* (2013.01); *B23C 2200/0494* (2013.01);
  (Continued)

(58) Field of Classification Search
  CPC . B23C 5/207; B23C 5/109; B23C 2200/0494; B23C 2200/286; B23C 2200/367; B23C 2200/08; B23C 2200/433
  (Continued)

(56) References Cited

U.S. PATENT DOCUMENTS 4,294,566 A * 10/1981 Boone ................. B23B 27/1622
  407/104
4,790,693 A 12/1988 Koblesky
  (Continued)

FOREIGN PATENT DOCUMENTS

CN  1655901 A  8/2005
DE  29912025 U1  9/1999
  (Continued)

OTHER PUBLICATIONS

Official Action for corresponding Chinese Patent Application No. 201380057545.X, mailed Apr. 6, 2016.
  (Continued)

*Primary Examiner* — Sara Addisu
(74) *Attorney, Agent, or Firm* — Jason H. Vick; Sheridan Ross, PC

(57) ABSTRACT

The disclosure relates to a cutting insert for a tool for machining a workpiece, comprising: two identical mutually opposite base surfaces, wherein at least a part of each base surface is orthogonal to a z-axis of the cutting insert, two identical mutually opposite main side surfaces which extend between the two base surfaces, wherein at least a part of each main side surface is oriented orthogonally to an x-axis of the cutting insert, and two identical mutually opposite secondary side surfaces which extend between the two base surfaces, wherein at least a part of each secondary side surface is oriented orthogonally to a y-axis of the cutting insert, wherein the x-, y- and z-axes are main axes of the cutting insert that are oriented orthogonally to one another, wherein between each one of the base surfaces and each one of the main side surfaces a main cutting edge is arranged, and wherein each main side surface has two diagonally opposite first segmental cutting edges, wherein each first segmental cutting edge adjoins a first end of the respective main cutting edge, wherein the main cutting edges and the first segmental
  (Continued)

cutting edges of each main side surface are each located in a cutting edge plane which extends orthogonally to the x-axis, wherein the first segmental cutting edges are each arranged on a first protrusion which is arranged on each of the secondary side surfaces and defines a first clearance angle.

15 Claims, 7 Drawing Sheets

(52) U.S. Cl.
CPC .... *B23C 2200/08* (2013.01); *B23C 2200/286* (2013.01); *B23C 2200/367* (2013.01); *Y10T 407/1936* (2015.01); *Y10T 407/23* (2015.01); *Y10T 407/235* (2015.01)

(58) Field of Classification Search
USPC .............................................. 407/113, 42, 62
See application file for complete search history.

(56) References Cited

U.S. PATENT DOCUMENTS

| | | | | |
|---|---|---|---|---|
| 5,004,380 A * | 4/1991 | Hessman | ................ | B23C 5/202 407/113 |
| 5,454,671 A * | 10/1995 | Qvarth | .................... | B23C 5/202 407/113 |
| 6,238,146 B1 * | 5/2001 | Satran | ................. | B23B 27/1614 407/113 |
| 6,929,427 B2 * | 8/2005 | Satran | .................... | B23C 5/109 407/113 |
| 6,929,428 B1 * | 8/2005 | Wermeister | ............... | B23C 3/08 407/113 |
| 7,357,604 B2 * | 4/2008 | Craig | ..................... | B23C 5/207 407/113 |
| 7,410,331 B2 * | 8/2008 | Ejderklint | ................. | B23C 5/06 407/113 |
| 7,549,824 B2 * | 6/2009 | Agic | ....................... | B23B 27/16 407/113 |
| 7,553,112 B1 * | 6/2009 | Hecht | ................... | B23B 27/141 407/103 |
| 7,591,614 B2 * | 9/2009 | Craig | ..................... | B23C 5/109 407/113 |
| 7,909,544 B2 * | 3/2011 | Jansson | .................... | B23C 5/06 407/100 |
| 7,922,427 B2 * | 4/2011 | Spitzenberger | ......... | B23C 5/006 407/102 |
| 7,976,250 B2 * | 7/2011 | Fang | ....................... | B23C 5/109 407/113 |
| 8,043,031 B2 * | 10/2011 | Sung | ................... | B23B 27/1622 407/113 |
| 8,282,320 B2 * | 10/2012 | Hartlohner | .......... | B23B 27/1618 407/113 |
| 8,454,277 B2 * | 6/2013 | Dudzinsky | ............. | B23C 5/006 407/103 |
| 8,454,278 B2 * | 6/2013 | Hartlohner | .......... | B23B 27/1618 407/113 |
| 8,465,233 B2 * | 6/2013 | Ejderklint | ................. | B23C 5/08 407/103 |
| 8,496,415 B2 * | 7/2013 | Zitzlaff | ................ | B23B 27/145 407/113 |
| 8,702,353 B2 * | 4/2014 | Chen | ....................... | B23C 5/06 407/113 |
| 8,708,617 B2 * | 4/2014 | Choi | .................... | B23B 27/007 407/103 |
| 8,740,510 B2 * | 6/2014 | Ishida | ..................... | B23C 5/06 407/113 |
| 8,998,542 B2 * | 4/2015 | Ishi | ........................ | B23C 5/109 407/113 |
| 9,039,335 B2 * | 5/2015 | Hedberg | .................. | B23C 5/207 407/113 |
| 9,044,813 B2 * | 6/2015 | Choi | ......................... | B23C 5/08 |
| 9,168,590 B2 * | 10/2015 | Kaufmann | ............ | B23B 27/141 |
| 9,259,789 B2 * | 2/2016 | Eisen | ........................ | B23C 5/08 |
| 9,272,335 B2 * | 3/2016 | Ramesh | ................ | B23B 51/048 |
| 9,370,825 B2 * | 6/2016 | Ramesh | ................ | B23B 51/048 |
| 9,427,812 B2 * | 8/2016 | Gesell | ..................... | B23C 5/207 |
| 9,475,138 B2 * | 10/2016 | Morrison | ............... | B23C 5/2472 |
| 2004/0013478 A1 * | 1/2004 | Dehn | ......................... | B23C 5/22 407/113 |
| 2005/0063792 A1 * | 3/2005 | Satran | .................... | B23C 5/1072 407/113 |
| 2005/0214080 A1 * | 9/2005 | Satran | .................... | B23C 5/109 407/113 |
| 2005/0214081 A1 * | 9/2005 | Satran | ........................ | B23C 5/06 407/113 |
| 2006/0045636 A1 * | 3/2006 | Johnson | .................... | B23C 5/06 407/42 |
| 2006/0104736 A1 * | 5/2006 | Satran | .................... | B23C 5/207 409/132 |
| 2007/0003384 A1 * | 1/2007 | Smilovici | ............. | B23C 5/2221 407/113 |
| 2007/0031201 A1 * | 2/2007 | Maeda | .................... | B23C 5/109 407/34 |
| 2008/0003067 A1 * | 1/2008 | Ejderklint | ................. | B23C 5/06 407/40 |
| 2008/0226403 A1 * | 9/2008 | Craig | ..................... | B23C 5/207 407/113 |
| 2008/0273931 A1 * | 11/2008 | Spitzenberger | ......... | B23C 5/202 407/51 |
| 2009/0155004 A1 * | 6/2009 | Jansson | ..................... | B23C 5/06 407/40 |
| 2009/0285646 A1 * | 11/2009 | Oprasic | ..................... | B23C 5/06 407/114 |
| 2010/0119313 A1 * | 5/2010 | Hartlohner | .......... | B23B 27/1618 407/103 |
| 2010/0129166 A1 * | 5/2010 | Hartlohner | .......... | B23B 27/1618 407/102 |
| 2010/0158620 A1 * | 6/2010 | Spitzenberger | ......... | B23C 5/006 407/40 |
| 2011/0052337 A1 * | 3/2011 | Dudzinsky | ............. | B23C 5/006 407/40 |
| 2011/0164932 A1 * | 7/2011 | Choi | ......................... | B23C 5/06 407/40 |
| 2011/0299946 A1 * | 12/2011 | Hecht | ..................... | B23C 5/207 407/42 |
| 2012/0076596 A1 * | 3/2012 | Kim | ...................... | B23C 5/1027 407/69 |
| 2012/0195700 A1 | 8/2012 | Chen et al. | | |
| 2013/0039798 A1 | 2/2013 | Satran et al. | | |
| 2013/0129432 A1 * | 5/2013 | Jaeger | ..................... | B23C 5/207 407/42 |
| 2013/0156515 A1 * | 6/2013 | Satran | .................... | B23C 5/207 407/48 |
| 2013/0195566 A1 * | 8/2013 | Bhagath | ................. | B23C 5/207 407/33 |
| 2013/0302099 A1 * | 11/2013 | Choi | ......................... | B23C 5/08 407/113 |
| 2014/0064864 A1 * | 3/2014 | Kaufmann | ............ | B23B 27/141 407/114 |
| 2014/0298967 A1 * | 10/2014 | Ishi | ........................ | B23C 5/109 83/13 |
| 2015/0183032 A1 * | 7/2015 | Stark | ....................... | B23C 5/109 407/48 |
| 2015/0183034 A1 * | 7/2015 | Stark | ....................... | B23C 5/109 407/48 |
| 2015/0202698 A1 * | 7/2015 | Morrison | ............... | B23C 5/2472 407/36 |
| 2015/0306687 A1 * | 10/2015 | Choi | ......................... | B23C 5/2213 407/33 |
| 2015/0328688 A1 * | 11/2015 | Johansson | ............... | B23B 27/143 407/11 |

(56) References Cited

U.S. PATENT DOCUMENTS

2015/0328689 A1* 11/2015 Wernh ................. B23B 27/145
                                                             407/103

FOREIGN PATENT DOCUMENTS

| DE | 69902919 T2 | 8/2003 |
|----|-------------|--------|
| EP | 0278389 | 8/1988 |
| EP | 1572407 B1 | 10/1999 |
| JP | 2013-121638 | 6/2013 |
| WO | WO 00/02693 | 1/2000 |
| WO | WO 01/54848 | 8/2001 |
| WO | WO 03/101655 | 11/2003 |

OTHER PUBLICATIONS

International Search Report (Including Translation) for corresponding International Application No. PCT/EP2013/060766, issued Sep. 16, 2013.
Written Opinion for corresponding International Application No. PCT/EP2013/060766, issued Sep. 16, 2013.
International Preliminary Report on Patentability for corresponding International Application No. PCT/EP2013/060766, issued Apr. 2, 2015.

* cited by examiner

CUTTING INSERT AND TOOL FOR MACHINING A WORKPIECE

CROSS REFERENCES TO RELATED APPLICATIONS

This application is a continuation of international patent application PCT/EP2013/060766, filed on May 24, 2013 designating the U.S., which international patent application has been published in German language and claims priority from German patent application DE 10 2012 108 751.2, filed on Sep. 18, 2012. The entire contents of these priority applications are incorporated herein by reference.

BACKGROUND OF THE INVENTION

This disclosure relates to a cutting insert, in particular a tangential cutting insert, for a tool for machining a workpiece. Furthermore, the disclosure relates to a tool for machining a workpiece, in particular for tangential milling, having a tool holder which has at least one cutting-insert receptacle in which a cutting insert according to the present disclosure is releasably fastened.

Cutting inserts of the present type, which are generally denoted indexable cutting inserts or in particular as tangential cutting inserts, are usually used in applications for metalworking, in particular in milling or turning applications. Primarily, the present cutting inserts are used for tangential milling. Milling tools in which such cutting inserts are used typically comprise a rotationally symmetrical tool holder on the circumference of which at least one, but usually a multiplicity of said cutting inserts are releasably fastened.

The removal of material from the workpiece during the milling operation is ensured by high-precision blade edges or cutting edges which are formed in the cutting inserts. In order to keep the wear as low as possible, to withstand the very high cutting forces that arise during processing and to ensure precision that is as high as possible, these cutting inserts are usually produced from carbide. Nevertheless, on account of the high material stress, the cutting edges become worn over time. Therefore, in particular for milling operations which require high precision, the cutting inserts have to be replaced after a particular period of time.

In order to prevent the relatively expensive cutting inserts from having to be replaced in their entirety each time the cutting edges become worn, multisided cutting inserts which have a plurality of cutting edges that are arranged in a symmetrical manner with respect to one another have been developed. Such an indexable cutting insert having four identical main cutting edges that are arranged in a symmetrical manner with respect to one another is known for example from EP 1 572 407 B1.

The indexable cutting insert shown therein is formed so as to be rotationally symmetrical through 180° with regard to each of its three main axes. As soon as the used main cutting edge becomes worn, the indexable cutting insert can therefore be rotated and/or reversed through 180° and be fastened in the new position in the tool holder. In the event of wear to one of the four main cutting edges, the indexable cutting insert thus does not have to be replaced in its entirety but only rotated or reversed in the holder, and so machining can be continued with the previously unused, unworn main cutting edges.

On account of the symmetry properties of the indexable cutting insert, in which each main cutting edge has the same cutting edge geometry, the cutting properties are not changed by reversing or rotating the indexable cutting insert. In other words, one and the same indexable cutting insert can thus be used four times until all of the cutting edges become worn and the indexable cutting insert has to be disposed of.

In contrast to simple, non-reversible cutting inserts, such indexable cutting inserts afford much greater flexibility and, since they are usable repeatedly, can be used for much longer without this being associated with losses in terms of machining accuracy. Although such four-edged indexable cutting inserts are much more complex to produce than conventional, single-edged (non-reversible) cutting inserts, they prove to be not only more versatile but also, when considered as a whole, more cost-effective for the consumer.

However, from the point of view of the manufacturer of such indexable cutting inserts, the problem in structural terms is not only that of realizing the symmetry properties of such indexable cutting inserts with a plurality of identical cutting edges, but at the same time also ensuring that each of these cutting edges has the same machining properties and as a result is usable in an identical manner. The greatest problem is in this case often that of avoiding possible collisions with other components of the cutting insert or of the tool holder, and of ensuring secure seating of the cutting insert in the tool receptacle of the tool holder, so that optimal force introduction is ensured.

In particular, care must be taken to ensure that the cutting edges that are not being used at the particular time or other components of the cutting insert do not collide in an undesired manner with the workpiece. Thus, collisions with the workpiece must not occur at locations on the cutting insert which are not intended to be used for machining the workpiece at the particular time. In other words, care must thus be taken to ensure that the cutting edges that are not being used at the particular time run free. It stands to reason that such requirements are more difficult to meet in the case of indexable cutting inserts having a plurality of alternately usable cutting edges than is the case for conventional cutting inserts having only one cutting edge.

The above-mentioned symmetry properties, the free running of the remaining cutting edges and the avoidance of undesired collisions of the cutting insert with the workpiece is solved in the case of the indexable cutting insert known from EP 1 572 407 B1 in that the indexable cutting insert has two part-bodies which are twisted through a predefined angle with respect to one another about a main axis of the indexable cutting insert. The main cutting edges are thus twisted through a predefined angle with respect to one another. In this way, the required symmetry and free-running properties can be ensured in a technically sustainable manner. On the other hand, in the case of such an indexable cutting insert that is twisted on itself, a relatively large number of surfaces of complex shape arise. Such twisting results, in particular at the main insert surfaces, in relatively complex rake faces which are technically very demanding to manufacture. Demanding manufacture of this type, even if this should be technically feasible, is associated with very high manufacturing costs. Ultimately, this results in high unit costs of the indexable cutting inserts for the final consumer.

SUMMARY OF THE INVENTION

It is thus an object to provide a cutting insert of the type mentioned at the beginning which provides an alternative to the above-mentioned indexable cutting inserts known from the prior art and in particular is easier to produce.

In view of this object, a cutting insert is provided, wherein the cutting insert has three main geometrical axes, namely an x-axis, a y-axis, and a z-axis, which are oriented orthogonally to one another, wherein the cutting insert has a 180° rotational symmetry about the x-axis, about the y-axis and about the z-axis, respectively, and wherein the cutting insert comprises:

a first and a second base surface which are arranged mutually opposite to one another, wherein at least a part of each of the first and the second base surface is oriented orthogonally to the z-axis;

a first and a second main side surface which are arranged mutually opposite to one another and extend between the two base surfaces, wherein at least a part of each of the first and the second main side surface is oriented orthogonally to the x-axis;

a first and a second secondary side surface which are arranged mutually opposite to one another and extend between the two base surfaces, wherein at least a part of each of the first and the second secondary side surface is oriented orthogonally to the y-axis;

four main cutting edges, wherein a first one of the four main cutting edges is arranged between the first base surface and the first main side surface, a second one of the four main cutting edges is arranged between the second base surface and the first main side surface, a third one of the four main cutting edges is arranged between the second base surface and the second main side surface, and a fourth one of the four main cutting edges is arranged between the first base surface and the second main side surface;

four first segmental cutting edges, wherein a first and a second one of the four first segmental cutting edges are arranged in diagonally opposite corners of the first main side surface, a third and a fourth one of the four first segmental cutting edges are arranged in diagonally opposite corners of the second main side surface, and wherein the first one of the first segmental cutting edges adjoins a first end of the first main cutting edge, the second one of the first segmental cutting edges adjoins a first end of the second main cutting edge, the third one of the first segmental cutting edges adjoins a first end of the third main cutting edge, and the fourth one of the first segmental cutting edges adjoins a first end of the fourth main cutting edge;

four secondary cutting edges, each of which extends in a rectilinear manner and adjoins one of the four first segmental cutting edges, respectively, wherein a first one of the four secondary cutting edges is arranged at a transition between the first main side surface and the first secondary side surface, a second one of the four secondary cutting edges is arranged at a transition between the first main side surface and the second secondary side surface, a third one of the four secondary cutting edges is arranged at a transition between the second main side surface and the first secondary side surface, and a fourth one of the four secondary cutting edges is arranged at a transition between the second main side surface and the second secondary side surface;

four first protrusions, wherein a first and a third one of the four first protrusions are arranged in diagonally opposite corners of the first secondary side surface, wherein a second and a fourth one of the four first protrusions are arranged in diagonally opposite corners of the second secondary side surface, and wherein each of the first protrusions defines a first clearance angle;

wherein the first and the second main cutting edges and the first and the second one of the first segmental cutting edges are arranged in a first cutting edge plane, wherein the third and the fourth main cutting edges and the third and the fourth one of the first segmental cutting edges are arranged in a second cutting edge plane, wherein the first and the second cutting edge planes are parallel to one another and extend orthogonally to the x-axis;

wherein each of the first segmental cutting edges is arranged on one of the four first protrusions, respectively; and wherein each secondary cutting edge encloses a second clearance angle with a parallel to the z-axis.

According to a second aspect, a cutting insert is provided which comprises: two identical mutually opposite base surfaces, wherein at least a part of each base surface is orthogonal to a z-axis of the cutting insert, two identical mutually opposite main side surfaces which extend between the two base surfaces, wherein at least a part of each main side surface is oriented orthogonally to an x-axis of the cutting insert, and two identical mutually opposite secondary side surfaces which extend between the two base surfaces, wherein at least a part of each secondary side surface is oriented orthogonally to a y-axis of the cutting insert, wherein the x-, y- and z-axes are main axes of the cutting insert that are oriented orthogonally to one another, wherein between each one of the base surfaces and each one of the main side surfaces a main cutting edge is arranged, and wherein each main side surface has two diagonally opposite first segmental cutting edges, wherein each first segmental cutting edge adjoins a first end of the respective main cutting edge, wherein the main cutting edges and the first segmental cutting edges of each main side surface are each located in a cutting edge plane which extends orthogonally to the x-axis, wherein the first segmental cutting edges are each arranged on a first protrusion which is arranged on each of the secondary side surfaces and defines a first clearance angle, wherein a secondary cutting edge that extends in a rectilinear manner adjoins each first segmental cutting edge, wherein each secondary cutting edge is arranged at the transition between the respective main side surface and the respective secondary side surface; and wherein each secondary cutting edge encloses a second clearance angle with a parallel to the z-axis in the respective cutting edge plane.

According to a third aspect, a tool for machining a workpiece is provided which has a tool holder with at least one cutting-insert receptacle in which a cutting insert of the above-mentioned type is releasably fastened.

In contrast to the indexable cutting inserts, known from the prior art, having four identical cutting edges, it is also possible to ensure the required symmetry and free-running properties even without twisting of the cutting insert on itself about one of its main axes. The cutting insert according to the disclosure, just like the cutting inserts known from the prior art, ensures that all of the provided cutting edges are usable in an identical manner without any aspect of the cutting properties changing during machining.

The cutting insert according to the disclosure thus preferably has exactly four identical main cutting edges. Unlike in the case of the cutting insert known from EP 1 572 407 B1, the clearance angles necessary for free-running and optimal machining properties are not achieved by twisting of the cutting insert on itself or twisting of the main cutting edges with respect to one another about the z-axis, but are realized by protrusions provided on the secondary side surfaces, the necessary clearance angles being integrated into said protrusions. The fact that the protrusions define a clearance angle should thus be understood such that at least one clearance angle is created by or arises as a result of each of the protrusions, respectively.

The main cutting edges and the (first) segmental cutting edges of each main side surface, in contrast to the cutting inserts known from the prior art, are each located in a common cutting edge plane. Since the cutting insert according to the disclosure has a total of two main side surfaces each having two main cutting edges, the two main cutting edges of the first main side surface are located in a common first cutting edge plane and the two main cutting edges of the second main side surface are located in a second cutting edge plane which extends parallel thereto. In just the same way, the first segmental cutting edges arranged on each main side surface are likewise located in these cutting edge planes, that is to say the first segmental cutting edges of the first main side surface are located in a plane (first cutting edge plane) together with the main cutting edges of the first main side surface, and the first segmental cutting edges of the second main side surface are likewise located in a plane (second cutting edge plane) with the main cutting edges of the second main side surface.

These "cutting edge planes" are imaginary planes which are not actually physically present. These imaginary cutting edge planes are oriented orthogonally to the x-axis in the present case. The main cutting edges and the first segmental cutting edges of each main side surface are thus not offset in the x-direction with respect to one another. According to a refinement, the first segmental cutting edges are configured as corner radii or bevels.

As already mentioned above, an essential feature of the cutting insert according to the disclosure can be seen in the fact that each secondary side surfaces comprises two so-called first protrusions. The clearance angles necessary for the free-running properties, required during machining, of the cutting insert are formed into these first protrusions. As a result, the main cutting edges, in contrast to the indexable cutting inserts known from the prior art, can extend parallel to one another. The designation "first protrusions" should in this case be considered merely to be the name or definition for protrusions of identical shape or identical size.

According to the disclosure, each of the two secondary side surfaces has two first protrusions which are arranged in two diagonally opposite corners of the secondary side surface. On account of their shape, these first protrusions can also be referred to as noses, since they project with respect to the y-axis from the respective secondary side surfaces. They are arranged in the corners at the transitions between the three main surfaces, that is to say between the base surface, main side surface and secondary side surface. A respective end of the first protrusions thus adjoins in each case one of the first segmental cutting edges or transitions into the latter. The first segmental cutting edges, as already mentioned, each adjoin one end of the respective main cutting edge. Each of the first segmental cutting edges is preferably configured as a radius or bevel or as a corner radius or corner bevel. Thus, a corner or corner edge that tapers to a point does not arise at said end of the respective main cutting edge, but rather an arcuate, rounded or flattened edge. Since the workpiece can also be machined with these corner radii or corner bevels, these are generally denoted first segmental cutting edges in the present case. The designation "first segmental cutting edges" should in this case be considered merely to be the name or definition for segmental cutting edges of identical shape or identical size, and does not imply the number thereof.

The above-mentioned first clearance angle is an angle which encloses the flank, defined by the first protrusion, with a parallel to the x-axis. The first clearance angle thus prevents in each case a collision of the remaining cutting edges that are not used during machining or of the secondary side surface with the workpiece. According to the disclosure, this first clearance angle is in the range from 1° to 10°, preferably in the range from 3° to 4°. In a refinement of the cutting insert according to the disclosure, the first clearance angle was provided for example with a size of 3.71°.

A first clearance angle that is as large as possible is desirable on one side, since the cutting insert has to be arranged in this case in a manner twisted only about a relatively small axial angle in the insert seat of the tool holder. A small axial angle has in turn the advantage that the contour deviation (deviation of the cutting contour that is produced on the workpiece from the cutting edge contour of the cutting insert) that arises on the workpiece during machining is relatively small. On the other hand, the size of the first clearance angle is upwardly limited, since an excessively large negative cut should be avoided, since this would have a negative effect on the machining properties. The expression negative cut is used when chip removal takes place via the rake face in the direction toward the decreasing material (in the direction toward the slot wall that arises during processing).

As a result of the respective two first protrusions which are provided on the secondary side surfaces and into which the clearance angles are integrated, success has been had in preserving the symmetry properties of the cutting insert and nevertheless ensuring the free-running properties (although the main cutting edges are arranged parallel to one another).

In order to change from machining with the main cutting edge to machining with the next main cutting edge, the cutting insert merely has to be released from the tool holder and then either rotated through 180° about the z-axis or reversed through 180° about the x-axis. The cutting insert according to the disclosure is thus preferably has a 180° rotational symmetry not only about the x-axis but also about the y-axis and about the z-axis.

At this point it should be noted that, within the meaning of this disclosure, "180° rotational symmetrical" means that the cutting insert coincides with itself when rotated through 180° about one of its main axes (x-, y- or z-axis). The x-axis, the y-axis and the z-axis thus form the main axes of the cutting insert, which should at the same time be considered to be axes of symmetry.

It should also be noted that "base surface", "main side surface", "secondary side surface" should be understood as meaning the respective main sides of the cutting insert, but not absolutely necessarily purely planar surfaces. Each base surface, main side surface and secondary side surface thus forms one of the six spatial sides of the cutting insert and can each be composed of a number of planar, curved or else vaulted part surfaces which are located in different planes. According to the disclosure, only a part of these surfaces is ever configured in a planar manner and in a manner perpendicular to one of the three main axes. In turn, a part of these part surfaces, configured in a planar manner and in a manner orthogonal to the main axes, of the base surfaces, main side surfaces and secondary side surfaces can be used as a bearing surface on the tool holder.

Since the main cutting edges are configured in a manner parallel to one another, that is to say not arranged in a manner twisted with respect to one another as in the prior art, said planar surfaces can be configured relatively easily on each of these side surfaces. In contrast to the cutting inserts known from the prior art, the cutting insert according to the disclosure can be manufactured relatively easily as a result. The number of surfaces of complex shape that are to be subsequently ground is reduced by a multiple. The insert seat can be also shaped in a simpler and more mechanically stable manner than is the case for the cutting inserts known from the prior art. This is also positively reflected of course in respect of the costs to the consumer of such cutting inserts.

Each of the four main cutting edges transitions at one of its ends (known as the first end) into a first segmental cutting edge, wherein this first segmental cutting edge in turn merges in each case into a secondary cutting edge that extends in a rectilinear manner. Each of the first segmental cutting edge can be configured in an arcuate manner (as a corner radius), respectively. It is arranged on two diagonally opposite corners of the respective main side surface. The respectively adjoining secondary cutting edge extends at the transition between the respective main side surface and the respective secondary side surface. This secondary cutting edge is also arranged, just like the first segmental cutting edge, on one of the first protrusions, respectively. Each first protrusion arranged on the secondary side surfaces thus merges, at the boundary between the secondary side surface and main side surface, into a first segmental cutting edge and a rectilinear secondary cutting edge. The rectilinear secondary cutting edges are also denoted wiping cutting edges on account of their arrangement.

Each of these secondary cutting edges that extends in a rectilinear manner encloses a second clearance angle in the respective cutting edge plane with a parallel to the z-axis. This second clearance angle is particularly necessary, since during tangential milling the workpiece is machined not only with the main cutting edges but also is cut as it were over the corner formed by the first segmental cutting edge and the secondary cutting edge. To be more precise, cutting is carried out as far as the tangential transition between the first segmental cutting edge and the adjoining secondary cutting edge. As a result of the clearance angles described, the secondary cutting edge runs free in the process. The workpiece is therefore machined, specifically during tangential slot milling, not only in the slot bottom but also at the same time on the slot wall.

The above-mentioned second clearance angle is formed by the first protrusion in the present case, in a similar manner to the first clearance angle. In other words, the second clearance angle is formed, just like the first clearance angle, into one of the first protrusions, respectively.

With regard to the second clearance angles, it should also be mentioned that these preferably have a size of 1° to 10°, in particular between 1° and 5°, as well. In one specific exemplary embodiment of the cutting insert according to the disclosure, an angle of 3.25° was defined. This clearance angle is sufficient to cut over the corners of the cutting insert during tangential milling.

In one refinement, each main side surface also has two diagonally opposite second segmental cutting edges which each adjoin a second end of the respective main cutting edge and are each formed on a second protrusion provided on the secondary side surfaces, said second protrusion defining a third clearance angle.

Thus, in this refinement, each main cutting edge transitions at its respective first end into a first segmental cutting edge, respectively, and at its second (other) end into a second segmental cutting edge, respectively. The designations "first segmental cutting edge" and "second segmental cutting edge" do not refer to the number of segmental cutting edges but are used merely to differentiate between the individual types of segmental cutting edges. Each main cutting edge is thus assigned a respective one of the first segmental cutting edges (at the first end) and a respective one of the second segmental cutting edges (at the second end). Overall, the cutting insert in this refinement has four first segmental cutting edges and four second segmental cutting edges, that is to say two first and two second segmental cutting edges per main side surface. The first segmental cutting edges and the second segmental cutting edges are in this case arranged in each case in the four corners of each main side surface. The second segmental cutting edges are preferably likewise configured as corner radii or corner bevels.

Preferably, the second protrusions are configured to be smaller than the first protrusions. The reasons for this once again reside in the free-running properties to be maintained, that is to say in order to avoid collisions. Depending on the milling application, it is thus possible, using the cutting insert according to this refinement, to cut via both corners, or, in the case of tangential slot milling tools, in which a plurality of cutting inserts are axially offset with respect to one another, the respective set-back corner having the second segmental cutting edge does not press in an undesired manner against the workpiece. This reduces flank wear that occurs.

The first segmental cutting edges are thus formed on the first protrusions (first type of protrusions) and the second segmental cutting edges on the second protrusions (second type of protrusions).

According to a refinement, each main side surface has a main bearing surface which is oriented orthogonally to the x-axis of the cutting insert and is offset inwardly in the direction of the x-axis toward the geometric center of the cutting insert with respect to the respective cutting edge plane. This main bearing surface represents one of the bearing surfaces by way of which the cutting insert in the cutting-insert receptacle bears against the tool holder. This main bearing surface is preferably a planar surface which is oriented orthogonally to the x-axis. As already mentioned, this planar surface is offset inwardly along the x-axis from the imaginary cutting edge plane. The main cutting edges, the first and second segmental cutting edges and the secondary cutting edges thus project from the main bearing surface arranged on the respective main side surface.

Each main side surface preferably additionally has two rake faces which extend between the main cutting edges and the main bearing surface and are oriented transversely to the x-axis. The main cutting edges thus merge into the main bearing surfaces via rake faces that are oriented obliquely with respect to the x-axis and are each configured in a planar manner. The chip produced at the main cutting edges can run off at these rake faces.

According to a further refinement, each secondary side surface has a secondary bearing surface which extends orthogonally to the y-axis of the cutting insert and is offset inwardly in the direction of the y-axis toward the geometric center of the cutting insert with respect to the first protrusions provided on the respective secondary side surface.

Preferably, the cutting insert according to the disclosure thus has two opposite main bearing surfaces and two likewise opposite secondary bearing surfaces. In the mounted state, the cutting insert preferably rests on one of its base surfaces against the bottom of the insert seat and additionally bears in each case against the tool holder by way of a main bearing surface and a secondary bearing surface. On account of the fact that the cutting insert according to the disclosure is not twisted on itself, unlike the cutting inserts known from the prior art, these main bearing surfaces and secondary bearing surfaces can be provided relatively easily without having to be ground into the cutting insert body in a complicated method.

Furthermore, the cutting insert according to the disclosure preferably has a through-bore which extends orthogonally to the two base surfaces and passes through the latter. This through-bore serves substantially for fastening the cutting insert in the tool holder. To this end, preferably a fastening means, in particular a screw, is passed through this through-bore and fastened to the tool holder.

Since the disclosure relates not only to the cutting insert itself but also to the tool in which this cutting insert is used, the following is mentioned finally in this regard. The cutting insert used in the cutting-insert receptacle of the tool holder is, according to the disclosure, arranged in a manner twisted through a defined cutting edge twist angle about a radial direction of the tool holder such that the main cutting edge used for machining encloses its cutting edge twist angle with a plane which is defined by the radial direction and a rotation axis of the tool holder. The main cutting edge used for machining is thus, in other words, arranged in a manner rotated slightly with respect to the machining or rotation direction of the milling tool. As a result, the cutting edge twist angle, which is also referred to as an axial angle on account of its arrangement, is produced.

The rotation of the indexable cutting insert or of the cutting insert within the tool holder has essentially the purpose of avoiding collisions with the non-used cutting edges and also collisions with the above-described first and second protrusions.

Without the above-described provided clearance angle, in particular without the above-described first clearance angle, the axial angle or the cutting edge twist angle would have to be selected to be much larger. However, in the case of a negative cut, as is produced in the case of the present cutting insert, this would be disadvantageous for the cutting properties. However, since, according to the disclosure, a clearance angle of 3.71° is selected, for example, an axial angle or cutting edge twist angle of 1° is already sufficient to avoid collisions. However, in principle, other axial angles, for example from 0.1°-10° would also be conceivable. However, an axial angle that is as small as possible is advantageous in order to keep the contour deviation that arises on the workpiece as small as possible.

A further reason for the provided axial angle is that of avoiding perpendicular force application and of ensuring optimal chip formation or chip removal.

At this point, it should be noted that the use of the indexable cutting insert according to the disclosure is described primarily using the example of a tangential slot milling tool. However, the indexable cutting insert according to the disclosure can likewise also be used in end mills or in a turning holder. Therefore, the indexable cutting insert according to the disclosure is not limited to the application described in the present case.

The above-mentioned features and those yet to be explained in the following text are usable not only in the combination given in each case but also in other combinations or on their own, without departing from the spirit and scope of the disclosure.

DESCRIPTION OF PREFERRED EMBODIMENTS

Figure 1:
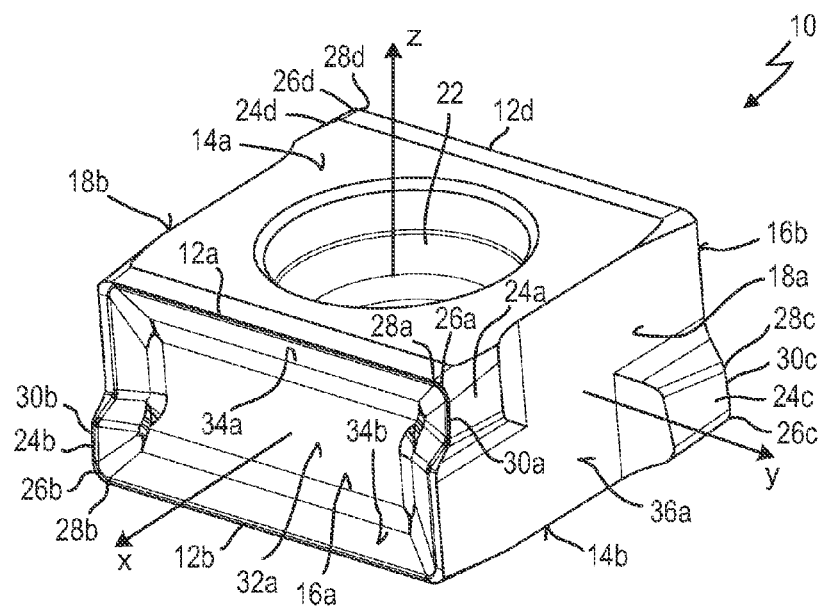
FIG. 1 shows a perspective view of a first embodiment of the cutting insert according to the disclosure.

FIGS. 1 to 6 show a first embodiment of the cutting insert according to the disclosure in various views, wherein the cutting insert is characterized as a whole by the reference sign 10. It is clear from the perspective view illustrated in FIG. 1 that it is in this case a four-edged indexable cutting insert 10 having four identical rectilinear main cutting edges 12a-d, a first main cutting edge 12a, a second main cutting edge 12b, a third main cutting edge 12c and a fourth main cutting edge 12d (third main cutting edge 12c is illustrated in a concealed manner in FIG. 1, see in this regard for example FIG. 4).

On account of its main use purpose, specifically tangential milling or tangential slot milling, this type of cutting insert 10 is also referred to as a tangential cutting insert. Viewed overall, the cutting insert 10 is substantially cuboidal, although it deviates at a number of points from the cuboidal shape. The external shape of the cutting insert body is delimited by six surfaces: a first base surface 14a, a second base surface 14b, a first main side surfaces 16a, a second main side surfaces 16b, a first secondary side surfaces 18a, and a second secondary side surface 16b. It goes without saying that, on account of the perspective view, some of the surfaces (surfaces 14b, 16b and 18b) are concealed in FIG. 1.

Furthermore, it should be noted here that the surfaces denoted base surface 14a, b, main side surface 16a, 16b and secondary side surface 18a, b, respectively, do not mean purely planar surfaces that are located in one plane, but rather the main sides delimiting the body of the cutting insert 10. Each of these surfaces 14a, b, 16a, b, 18a, b is made up of a plurality of partially planar surfaces. A part of each of these surfaces 14a, b, 16a, b, 18a, b extends perpendicularly to one of the main axes of the cutting insert 10, respectively, which main axes are denoted x-, y- and z-axis. A part of each of the identical mutually opposite base surfaces 14a, b extends orthogonally to the z-axis of the cutting insert 10. A part of the likewise identical mutually opposite main side surfaces 16a, b extends orthogonally to the x-axis of the cutting insert 10; and a part of each of the likewise identical mutually opposite secondary side surfaces 18a, b extends orthogonally to the y-axis of the cutting insert 10.

Overall, the cutting insert 10 presented here is thus an indexable cutting insert which has a 180° rotational symmetry about each of its three main axes (x-, y- and z-axis). On rotation through 180° about one of these axes, the cutting insert 10 thus in turn coincides with itself. The x-, y- and z-axes can thus also be denoted axes of symmetry of the cutting insert 10, which meet at the geometrical center of the cutting insert 10. On account of these symmetry properties, the cutting insert 10 can be inserted in four different positions in the tool holder, without this resulting in a change in the cutting geometry or the cutting properties. For example, the first main cutting edge 12a could be used first for machining. As soon as the latter becomes worn, the cutting insert 10 can be reversed through 180° about the x-axis, and so the second main cutting edge 12b then comes into use. In order then to allow the third and the fourth main cutting edges 12c and 12d to come into use, the cutting insert 10 has in turn to be rotated only through 180° about the z-axis or reversed once again through 180° about the x-axis. It goes without saying that, to this end, the cutting insert 10 has to be released in each case from the tool holder and fastened again in its new position.

The cutting insert 10 is fastened to the tool holder preferably by a fastening element, for example by a screw 50, as is apparent from FIGS. 13 to 17, which will be dealt with in more detail below. To this end, this screw 50 can be inserted into the through-bore 22 introduced centrally into the cutting insert. The through-bore 22 extends preferably orthogonally to the two base surfaces 14a, b, that is to say along the z-axis. However, it goes without saying that other fastening possibilities are also readily conceivable, without departing from the scope of the disclosure.

The cutting insert 10 comprises first protrusions that are arranged on the secondary side surfaces 18a, b. The first one of the first protrusions is denoted by reference numeral 24a, the second by reference numeral 24b, the third by reference numeral 24c, and the fourth by reference numeral 24d. These protrusions 24a-d are configured in an identical manner. In the first embodiment, illustrated in FIGS. 1 to 6, of the cutting insert 10 two first protrusions 24a-d are provided per secondary side surface 18a, b, respectively, said first protrusions 24a-d each being arranged in two diagonally opposite corners of the secondary side surfaces 18a, b. The first protrusions 24a, c are arranged on the secondary side surface 18a. By contrast, the first protrusions 24b, d are arranged on the secondary side surface 18b.

The first protrusions 24a-d serve essentially to ensure the free-running properties, which are relatively difficult to ensure on account of the complexity of the cutting insert structure, for the components and cutting edges that are not used during the particular machining operation, or to avoid collisions. In contrast to twisting of the cutting insert 10 on itself, as is known from the prior art, the necessary clearance angles are thus produced substantially by the protrusions 24a-d in the present case. In order to produce the clearance angles and rake angles, a number of surfaces of complex shape are formed into the protrusions 24a-d, which are inclined relative to the main axes (x-, y-, z-axis) of the cutting insert 10.

Figure 2:
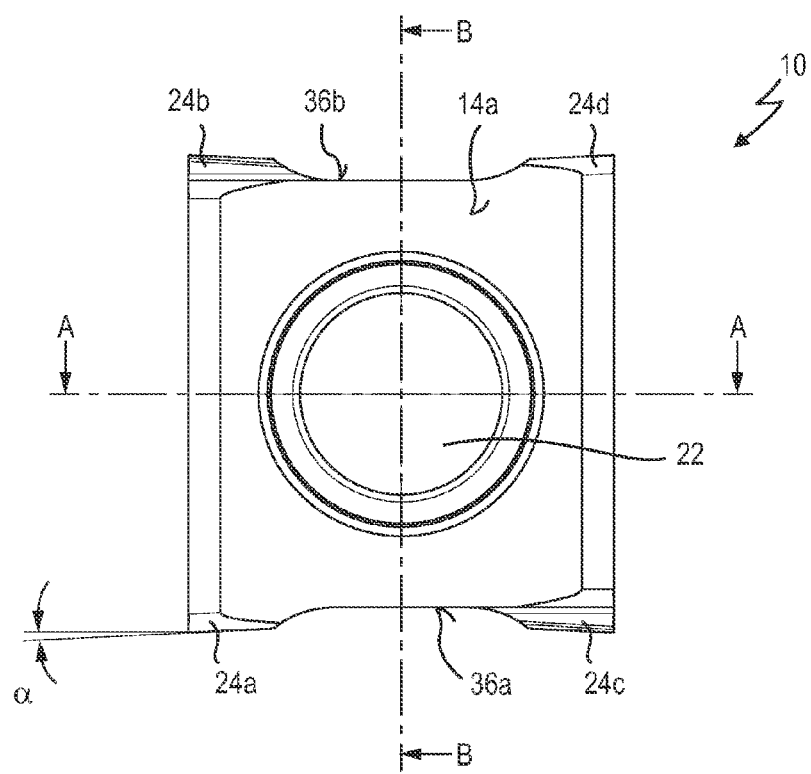
FIG. 2 shows a plan view of the first embodiment of the cutting insert from above.

In this way, in particular a first clearance angle α (see FIG. 2) and a second clearance angle β (see FIG. 3) can be produced. The first clearance angle α is a clearance angle which encloses a surface provided on the first protrusions 24a-d with a parallel to the x-axis, as is illustrated in FIG. 2. By contrast, the second clearance angle β is a clearance angle which encloses a surface provided on the first protrusions 24a-d with a parallel to the z-axis, as is apparent from FIG. 3. The clearance angles α, β produced by the first protrusions 24a-d arise substantially at the secondary cutting edges of the cutting insert 10.

In addition to the main cutting edges 12a-d, the cutting insert 10 has corner radii or corner bevels 26a-d which are denoted first segmental cutting edges 26a-d. The first one of the first segmental cutting edges is denoted by reference numeral 26a, the second by reference numeral 26b, the third by reference numeral 26c, and the fourth by reference numeral 26d. The first segmental cutting edges 26a-d each adjoin a first end 28a-d of the main cutting edges 12a-d. Each main cutting edge 12a-d that extends in a rectilinear manner thus transitions at its respective first end 28a-d into a first segmental cutting edge 26a-d. The main cutting edge 12a transitions at its first end 28a into the segmental cutting edge 26a; the main cutting edge 12b transitions at its first end 28b into the first segmental cutting edge 26b; etc.

Figure 3:
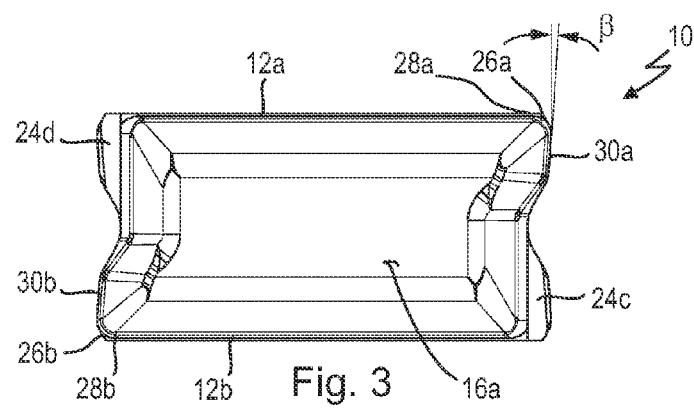
FIG. 3 shows a plan view of the first embodiment of the cutting insert from the front.
Figure 4:
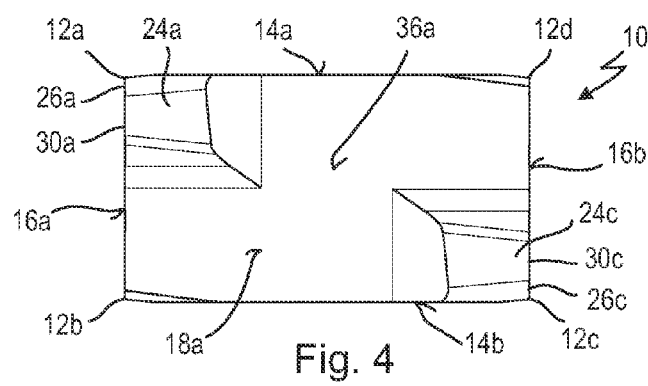
FIG. 4 shows a further plan view of the first embodiment of the cutting insert from the side.
Figure 5:
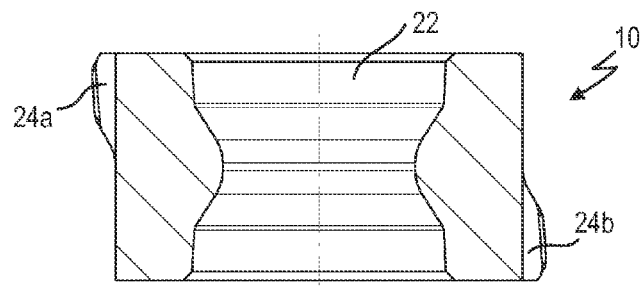
FIG. 5 shows a sectional view of the first embodiment of the cutting insert (section B-B from FIG. 2)
Figure 6:
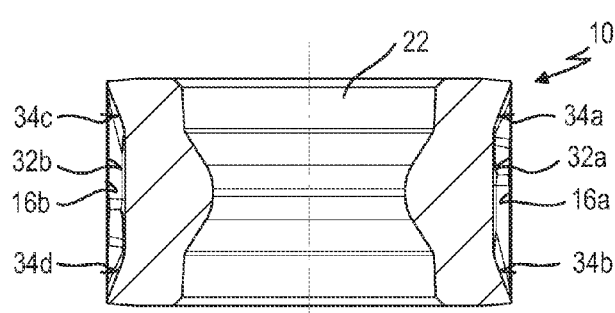
FIG. 6 shows a further sectional view of the first embodiment of the cutting insert (section A-A from FIG. 2)

Each of these first segmental cutting edges 26a-d in turn transitions into a secondary cutting edge 30a-d that extends in a rectilinear manner. The first one of the secondary cutting edges is denoted by reference numeral 30a, the second by reference numeral 30b, the third by reference numeral 30c, and the fourth by reference numeral 30d. The first segmental cutting edges 26a-d are thus arranged in two opposite corners of the main side surfaces 16a, b, respectively, and the secondary cutting edges 30a-d are arranged in a manner adjoining the latter at the transition between the respective main side surface 16a, b and the respective secondary side surface 18a, b. In other words, the secondary cutting edge 30a is arranged at the transition between the main side surface 16a and the secondary side surface 18a, the secondary cutting edge 30b is arranged at the transition between the main side surface 16a and the secondary side surface 18b, the secondary cutting edge 30c is arranged at the transition between the main side surface 16b and the secondary side surface 18a, and the secondary cutting edge 30d is arranged at the transition between the main side surface 16b and the secondary side surface 18b. The secondary cutting edges 30a-d that extend in a rectilinear manner, as is apparent in particular from FIGS. 1 and 3, are configured to be shorter than the main cutting edges 12ad respectively assigned thereto. All of the secondary cutting edges 30a-d are each arranged on one of the first protrusions 24a-d or adjoin the latter, respectively.

As a result of the surfaces formed into the first protrusions 24a-d, the first and second clearance angles α, β can thus be realized at the secondary cutting edges 30a-d. Depending on the embodiment, these clearance angles α, β can be configured with different sizes. Preferably, these clearance angles α, β are in the range between 0.5° and 10°, in particular in the range between 1° and 5°. In one specific embodiment, the first clearance angle α was defined with a size of 3.71° and the second clearance angle β was defined with a size of 3.25°. However, it goes without saying that other angle sizes are also conceivable, without departing from the scope of the disclosure.

As a result of the clearance angles α, β provided at the secondary cutting edges 30a-d, it is possible to machine the workpiece not only with the main cutting edges 12a-d, but also to machine via the corners of the cutting insert 10. The clearance angles α, β, which are formed into the protrusions 24a-d, ensure that in the case of such machining, undesired collisions with other components of the cutting insert 10 do not occur.

Since the necessary free-running properties are ensured in this way, in contrast to most cutting inserts of this type that are known from the prior art, it is possible to arrange the individual main cutting edges 12a, b and 12c, d, the individual first segmental cutting edges 26a, b and 26c, d, and the individual secondary cutting edges 30a, b and 30c, d in a common cutting edge plane, respectively. The cutting edges 12a, b, 26a, b and 30a, b are thus located in the same cutting edge plane. In the same way, the cutting edges 12c, d, 26c, d and 30c, d are also located in a common cutting edge plane. Both the cutting edge planes mentioned should be understood as being imaginary planes (not illustrated) which extend orthogonally to the x-axis. The main cutting edges 12a-d are thus not twisted with respect to one another but are arranged in a manner parallel to one another. They thus all extend parallel to the y-axis.

Furthermore, each main side surface 16a, b of the cutting insert 10 has one main bearing surface 32a, b which is oriented orthogonally to the x-axis of the cutting insert 10 and is offset inwardly in the direction of the x-axis toward the geometric center of the cutting insert 10 with respect to the respective (imaginary) cutting edge plane. The first main side surface 16a comprises the first main bearing surface 32a, and the second main side surface 16b comprises the second main bearing surface 32b. These main bearing surfaces 32a, b serve, as the name already suggests, as bearing surfaces by way of which the cutting insert 10 bears against the tool holder. The spatial offset between the cutting edges 12a-d and the main bearing surfaces 32a, b mentioned is most clearly apparent from the sectional view illustrated in FIG. 6.

As a result of the spatial offset of the main bearing surfaces 32a, b with respect to the cutting edges 12a-d, two rake faces 34a-d (see FIG. 6) furthermore arise on each main side surface 16a, b, respectively, said rake faces 34a-d extending in each case between the main cutting edges 12a-d and the main bearing surface and being oriented transversely, that is to say obliquely, with respect to the x-axis. The first rake surface is denoted by reference numeral 34a, the second by reference numeral 34b, the third by reference numeral 34c, and the fourth by reference numeral 34d.

Furthermore, each secondary side surface 18a, b of the cutting insert 10 has a secondary bearing surface 36a, b which extends orthogonally to the y-axis of the cutting insert 10 and is offset inwardly in the direction of the y-axis toward the geometric center of the cutting insert 10 with respect to the first protrusions 24a, c and 24b, d provided on the respective secondary side surface 18a, b. The first secondary side surface 18a comprises the first secondary bearing surface 36a, and the second secondary side surface 18b comprises the second secondary bearing surface 36b. These secondary bearing surfaces 36a, b serve as further perpendicular bearing surfaces for fastening the cutting insert 10 in the insert seat of the tool holder.

FIGS. 7 to 12 illustrate a second embodiment of the cutting insert 10 in various views, wherein this second embodiment is denoted overall by the reference numeral 20. Components that coincide with the first embodiment 10 are denoted by the same reference numerals therein or in some cases, for the sake of simplicity, are not marked again in the drawings.

Figure 7:
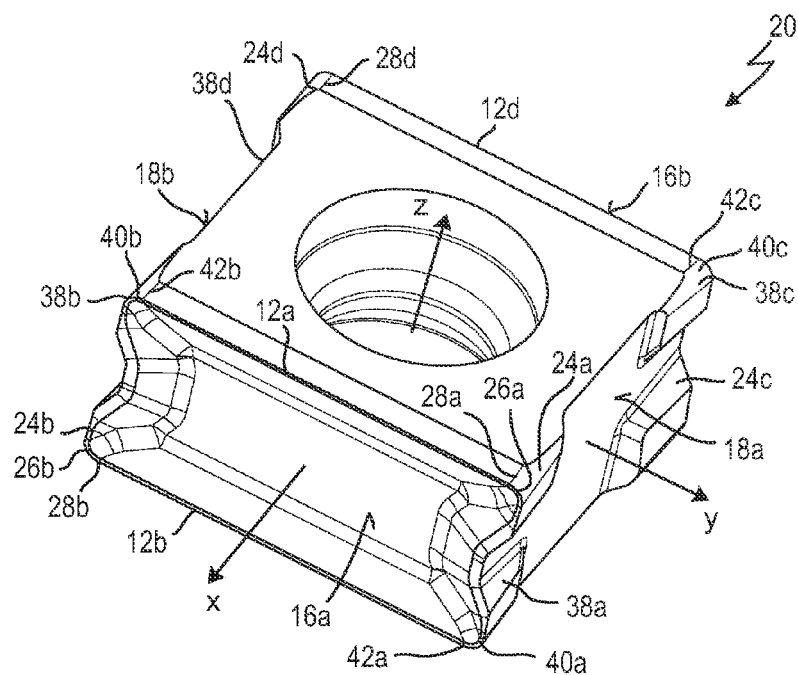
FIG. 7 shows a perspective view of a second embodiment of the cutting insert according to the disclosure.
Figure 8:
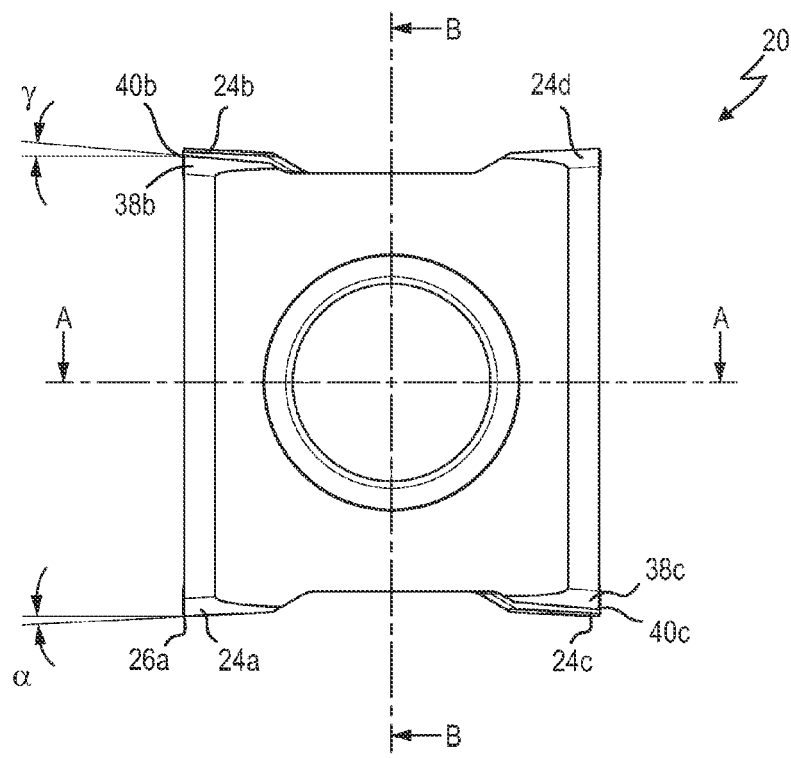
FIG. 8 shows a plan view of the second embodiment of the cutting insert from above.
Figure 9:
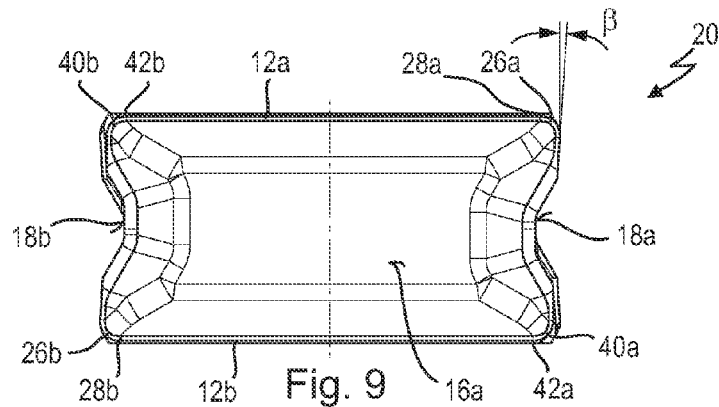
FIG. 9 shows a plan view of the second embodiment of the cutting insert from the front.
Figure 10:
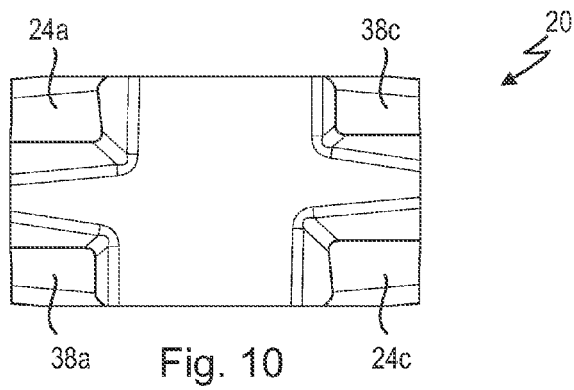
FIG. 10 shows a further plan view of the second embodiment of the cutting insert from the side.
Figure 11:
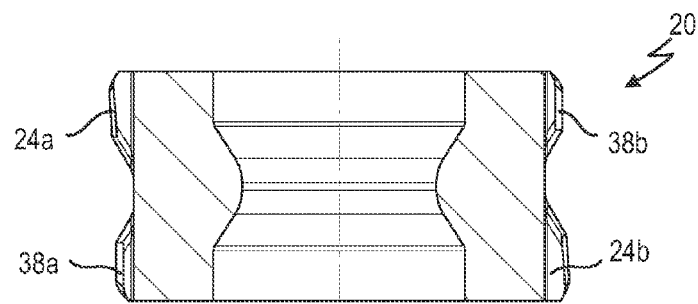
FIG. 11 shows a sectional view of the second embodiment of the cutting insert (section B-B from FIG. 8)
Figure 12:
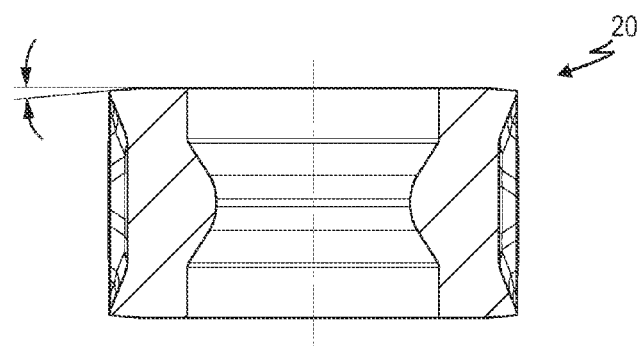
FIG. 12 shows a further sectional view of the second embodiment of the cutting insert (section A-A from FIG. 8)

As is apparent in particular from the perspective view, illustrated in FIG. 7, of the cutting insert 20, the second embodiment of the cutting insert 20 differs from the first embodiment of the cutting insert 10 essentially in that two further protrusions 38a, c and 38b, d (protrusion 38d concealed) are provided on each of the secondary side surfaces 18a, b, respectively. These further protrusions 38a-d are denoted second protrusions in the present case. They are also located in two diagonally opposite corners of the respective secondary side surface 18a, b. In the second illustrated embodiment of the cutting insert 20, two first protrusions 24a, c and 24b, d and two second protrusions 38a, c and 38b, d are thus located on each secondary side surface 18a, b, respectively.

The number and shape of the main cutting edges 12a-d is not changed as a result. Likewise, the symmetry properties about the x-, y- and z-axes already described with respect to the first embodiment of the cutting insert 10 are retained.

Also in the case of the cutting insert 20 the clearance angles necessary for the free-running properties of the secondary cutting edges are formed in each case into the protrusions 24a-d and 38a-d provided on the secondary side surfaces 18a, b, or are defined thereby. Otherwise, also in the case of the cutting insert 20 illustrated in FIGS. 7 to 12 all of the cutting edges of the respective main side surface 16a, 16b are arranged in a common plane which is oriented orthogonally to the x-axis.

In short, the difference is thus that the cutting insert 20 has a total of eight of the so-called "noses" provided on the secondary side surfaces 18a, b, in contrast to four thereof, as is the case in the cutting insert 10 according to the first embodiment (see FIGS. 1 to 6). As is apparent in particular from FIG. 10, the first protrusions 24a-d are in this case configured to be larger than the second protrusions 38a-d. On account of these second protrusions 38a-d, in contrast to the first embodiment (FIGS. 1 to 6), two segmental cutting edges 40a-d, which are denoted second segmental cutting edges 40a-d, thus arise on each main side surface 16a, b. The second segmental cutting edges 40a-d each adjoin a second end 42a-d of the respective main cutting edge 12a-d. Thus, each main cutting edge 12a-d transitions at its respective first end 28a-d into one of the first segmental cutting edges 26a-d and at its respective second end 42a-d into one of the second segmental cutting edges 40a-d. In other words: in the second embodiment of the cutting insert 20, all of the corners and edges of the cutting insert 20 are now provided with corner radii or corner bevels 26a-d and 40a-d. Each of the second segmental cutting edges 40a-d are formed (in a similar manner to the first segmental cutting edges 26a-d) on one of the second protrusions 38a-d provided on the secondary side surfaces 18a, b of the cutting insert 20.

Thus, a number of clearance angles now also arise at the second segmental cutting edges 40a-d (in a similar manner to on the first segmental cutting edges 26a-d). One of these clearance angles is denoted by the angle γ in FIG. 8. The angle γ in this case again denotes the clearance angle that arises at the second segmental cutting edges 40a-d, said clearance angle corresponding to the first clearance angle α that arises at the first segmental cutting edges 26a-d on the other side of each main cutting edge 12a-d. On account of the geometrical conditions, the angle γ is preferably configured to be larger than the angle α, however. Just like the angle α, the angle γ preferably has a size in the range from 1°-10°, in particular in the range from 1°-5°.

In one specific exemplary embodiment, a size of 5° was selected for the angle γ and a size of 3° was selected for the angle α. However, it goes without saying that other angle sizes are also conceivable without departing from the scope of the disclosure.

As a result of the further four segmental cutting edges 40a-d now provided in the corners of the cutting insert 20, in contrast to the first embodiment, it is possible to cut via the corners arranged at both ends of each main cutting edge 12a-d during machining. Thus, the entire width of the main cutting edges 12a-d can be virtually completely utilized and not only the slot bottom but at the same time also the slot wall can be machined in one operation. Collisions are virtually completely ruled out on account of the clearance angles provided at the protrusions 24a-d and 38a-d.

FIGS. 13 to 17 show by way of example a tool according to the disclosure, in which the cutting insert 10, 20 is typically used. The tool is designated as a whole by the reference sign 100 in these figures. The tool illustrated by way of example is illustrated in this case as a typical tangential milling tool 100, specifically as an end milling tool in the present case. This tangential milling tool 100 has a tool holder 44 which is rotationally symmetrical about a rotation axis 46. At least one, preferably a multiplicity of cutting insert receptacles 48 (illustrated in detail in FIG. 13), which act as a receptacle for the cutting insert 10 or 20, are provided on the circumference of the tool holder 44. In FIGS. 14 to 17, by way of example a cutting insert 20 of the second embodiment is inserted into one of the cutting insert receptacles 48. This cutting insert 20 is preferably fastened releasably to the tool holder 44 by way of a screw 50.

Figure 13:
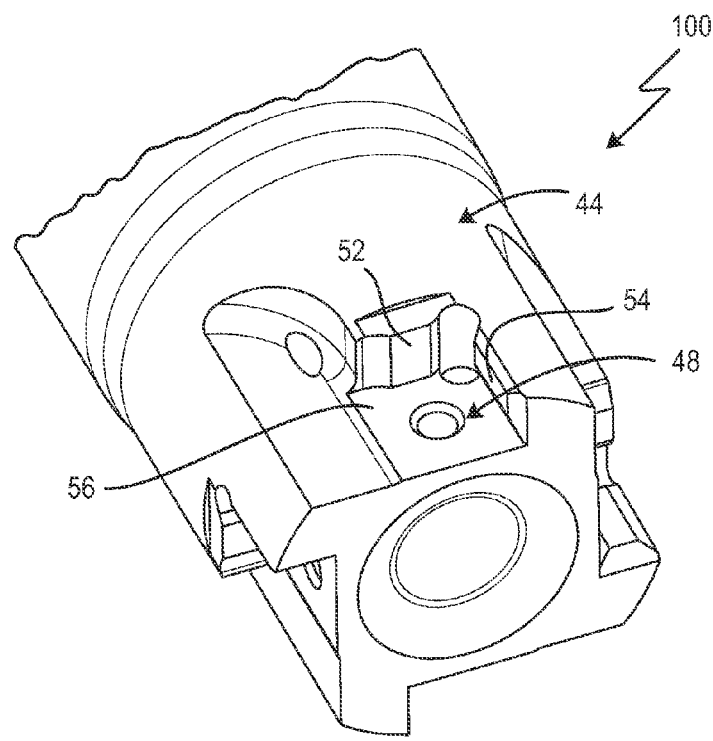
FIG. 13 shows a perspective view of a tool holder according to the disclosure without the cutting insert inserted therein.
Figure 14:
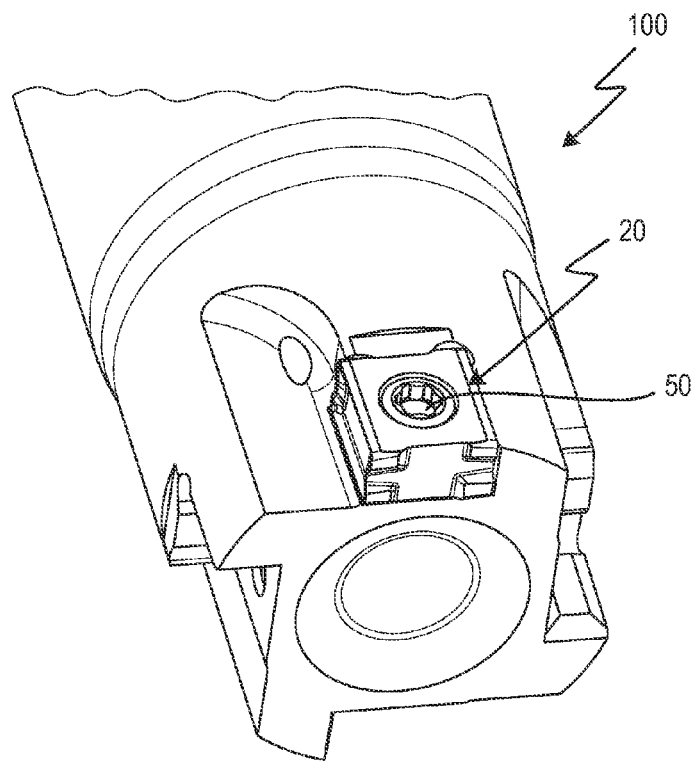
FIG. 14 shows a perspective view of the tool holder with the cutting insert inserted therein.
Figure 15:
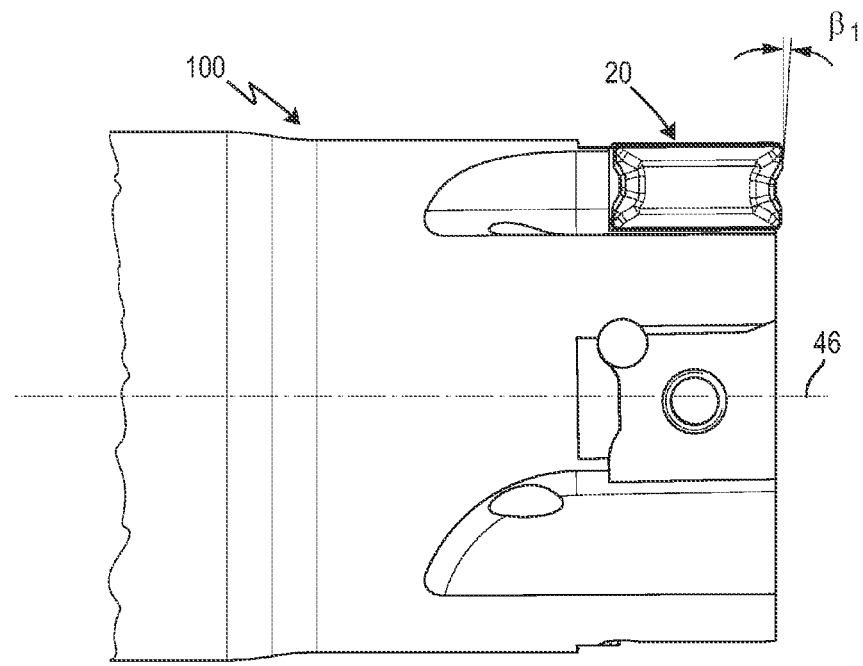
FIG. 15 shows a lateral plan view of the tool holder with an inserted cutting insert.
Figure 16:
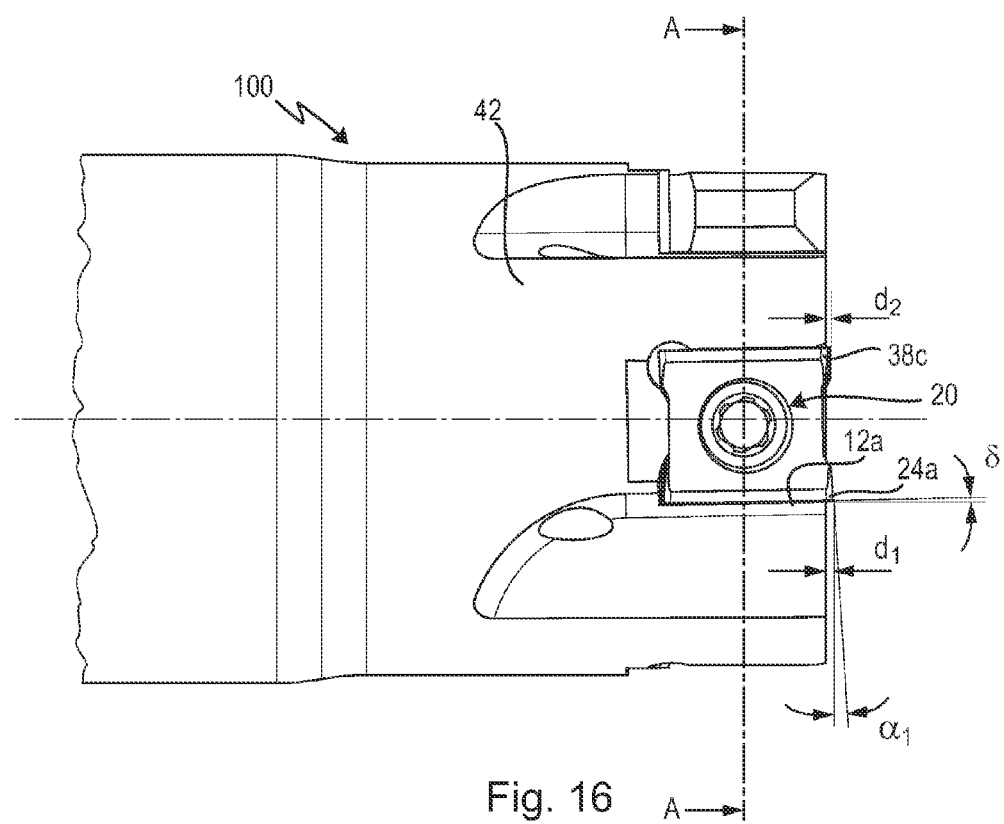
FIG. 16 shows a further lateral plan view of the tool holder with an inserted cutting insert.
Figure 17:
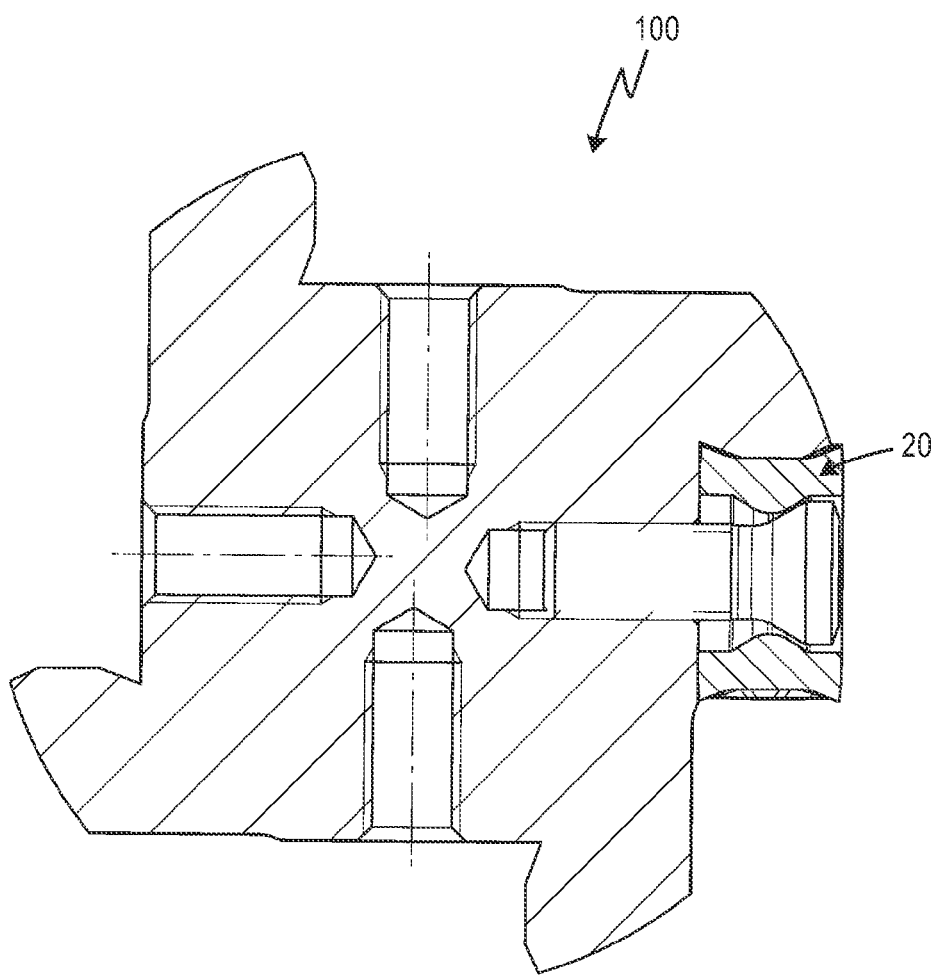
FIG. 17 shows a sectional view of the tool holder with an inserted cutting insert (section A-A from FIG. 16).

The structural details of the cutting insert receptacle 48 are apparent from FIG. 13. Each of the cutting insert receptacle 48 has bearing surfaces 52 and 54, respectively, at which the cutting insert 10 or 20 rests against the tool holder 44 by way of its main bearing surfaces 32a, b and secondary bearing surfaces 36a, b. A further base surface 56 arranged in the base of the cutting insert receptacle 48 serves as a bearing surface against which the cutting insert 10 or 20 rests by way of its respective base surfaces 14a or 14b. The bearing surfaces and base surfaces 52, 54, 56 of the cutting insert receptacle 48 are preferably configured orthogonally to one another. In this way, a mechanically stable and clearly defined insert seat is realized.

FIG. 16 illustrates once again the arrangement of the cutting insert 20 within the tool holder 42. The distances d1 and d2 illustrated therein show once again by way of example that the first protrusion 24a of the cutting insert 20 is configured to be larger than the second protrusion 38c (d1>d2). It is likewise apparent therefrom that the cutting insert 20 is arranged in the tool holder 42 in a manner twisted through an angle δ about its z-axis. This angle δ is also designated axial angle. More specifically, this is the angle which the main cutting edge 12a used for machining encloses with the axial direction of the tool holder 42. Since a clearance angle α1 is already integrated into the first protrusion 24a of the cutting insert 20, the axial angle or cutting edge twist angle δ does not have to be configured to be too large, in order to avoid collisions of the workpiece with the cutting insert, for example with the second protrusion 38c. However, without the above-described clearance angle, or first clearance angle α1, the cutting edge twist angle or axial angle δ would have to be configured to be much larger. It goes without saying that the clearance angle α1 differs slightly from the angle α illustrated in FIG. 8 on account of the axial angle δ.

An axial angle δ that is as small as possible has the advantage that little contour deviation occurs on the machined workpiece, since the cutting insert is arranged so as to be twisted only about a very small angle in the holder. Therefore, in particular axial angles δ in the range from 0.5° to 10°, preferably in the range from 1° to 5°, are preferred. In one specific exemplary embodiment, the angle δ was measured at 1°.

In summary, it can thus be stated that the inventors have succeeded in providing an alternative four-edged tangential cutting insert and a corresponding tool which, on account of its relatively simply configured cutting edge geometry, is cost-effective to manufacture and nevertheless has high machining accuracy. In contrast to the cutting inserts known from the prior art, the cutting insert according to the disclosure is not twisted on itself. The clearance angles that are required for the free-running properties are formed by what are referred to as "noses" which are arranged on the secondary side surfaces of the cutting insert. As a result, it is possible to machine the workpiece even with the cutting-edge corners without undesired collisions.

What is claimed is:

1. A cutting insert for a tool for machining a workpiece, wherein the cutting insert has three main geometrical axes, an x-axis, a y-axis, and a z-axis, which are oriented orthogonally to one another, wherein the cutting insert has a 180° rotational symmetry about the x-axis, about the y-axis and about the z-axis, respectively, and wherein the cutting insert comprises:
   a first and a second base surface which are arranged mutually opposite to one another, wherein at least a part of each of the first and the second base surface is oriented orthogonally to the z-axis;
   a first and a second main side surface which are arranged mutually opposite to one another and extend between the two base surfaces, wherein at least a part of each of the first and the second main side surface is oriented orthogonally to the x-axis;
   a first and a second secondary side surface which are arranged mutually opposite to one another and extend between the two base surfaces, wherein at least a part of each of the first and the second secondary side surface is oriented orthogonally to the y-axis;
   four main cutting edges, wherein a first one of the four main cutting edges is arranged between the first base surface and the first main side surface, a second one of the four main cutting edges is arranged between the second base surface and the first main side surface, a third one of the four main cutting edges is arranged between the second base surface and the second main side surface, and a fourth one of the four main cutting edges is arranged between the first base surface and the second main side surface;
   four first segmental cutting edges, wherein a first and a second one of the four first segmental cutting edges are arranged in diagonally opposite corners of the first main side surface, a third and a fourth one of the four first segmental cutting edges are arranged in diagonally opposite corners of the second main side surface, and wherein the first one of the first segmental cutting edges adjoins a first end of the first main cutting edge, the second one of the first segmental cutting edges adjoins a first end of the second main cutting edge, the third one of the first segmental cutting edges adjoins a first end of the third main cutting edge, and the fourth one of the first segmental cutting edges adjoins a first end of the fourth main cutting edge;

four secondary cutting edges, each of which extends in a rectilinear manner and adjoins one of the four first segmental cutting edges, respectively, wherein a first one of the four secondary cutting edges is arranged at a transition between the first main side surface and the first secondary side surface, a second one of the four secondary cutting edges is arranged at a transition between the first main side surface and the second secondary side surface, a third one of the four secondary cutting edges is arranged at a transition between the second main side surface and the first secondary side surface, and a fourth one of the four secondary cutting edges is arranged at a transition between the second main side surface and the second secondary side surface;

four first protrusions, wherein a first and a third one of the four first protrusions are arranged in diagonally opposite corners of the first secondary side surface, wherein a second and a fourth one of the four first protrusions are arranged in diagonally opposite corners of the second secondary side surface, and wherein each of the first protrusions defines a first clearance angle;

wherein the first and the second main cutting edges and the first and the second one of the first segmental cutting edges are arranged in a first cutting edge plane, wherein the third and the fourth main cutting edges and the third and the fourth one of the first segmental cutting edges are arranged in a second cutting edge plane, wherein the first and the second cutting edge planes are parallel to one another and extend orthogonally to the x-axis;

wherein each of the first segmental cutting edges is arranged on one of the four first protrusions, respectively; and wherein each secondary cutting edge encloses a second clearance angle with a parallel to the z-axis.

2. The cutting insert as claimed in claim 1, wherein the cutting insert comprises exactly four main cutting edges.

3. The cutting insert as claimed in claim 1, wherein the cutting insert comprises four second segmental cutting edges, wherein a first and a second one of the four second segmental cutting edges are arranged in diagonally opposite corners of the first main side surface, wherein a third and a fourth one of the four second segmental cutting edges are arranged in diagonally opposite corners of the second main side surface.

4. The cutting insert as claimed in claim 3, wherein the first one of the four second segmental cutting edges adjoins a second end of the second main cutting edge opposite the first end of the second main cutting edge, wherein the second one of the four second segmental cutting edges adjoins a second end of the first main cutting edge opposite the first end of the first main cutting edge, wherein the third one of the four second segmental cutting edges adjoins a second end of the fourth main cutting edge opposite the first end of the fourth main cutting edge, and wherein the fourth one of the four second segmental cutting edges adjoins a second end of the third main cutting edge opposite the first end of the third main cutting edge.

5. The cutting insert as claimed in claim 4, further comprising four second protrusions, wherein a first and a third one of the four second protrusions are arranged in diagonally opposite corners of the first secondary side surface, and wherein a second and a fourth one of the four second protrusions are arranged in diagonally opposite corners of the second secondary side surface, and wherein each of the second protrusions defines a third clearance angle.

6. The cutting insert as claimed in claim 5, wherein the first protrusions are larger than the second protrusions.

7. The cutting insert as claimed in claim 5, wherein the first secondary side surface has four corners, wherein the first one of the first protrusions is arranged in a first corner of the first secondary side surface, the first one of the second protrusions is arranged in a second corner of the first secondary side surface, the third one of the first protrusions is arranged in a third corner of the first secondary side surface, and the third one of the second protrusions is arranged in a fourth corner of the first secondary side surface.

8. The cutting insert as claimed in claim 5, wherein the second secondary side surface has four corners, wherein the second one of the second protrusions is arranged in a first corner of the second secondary side surface, the second one of the first protrusions is arranged in a second corner of the second secondary side surface, the fourth one of the second protrusions is arranged in a third corner of the second secondary side surface, and the fourth one of the first protrusions is arranged in a fourth corner of the second secondary side surface.

9. The cutting insert as claimed in claim 1, wherein the first main side surface has a first main bearing surface which is oriented orthogonally to the x-axis and is offset inwardly in the direction of the x-axis toward a geometric center of the cutting insert with respect to the first cutting edge plane, and wherein the second main side surface has a second main bearing surface which is oriented orthogonally to the x-axis and is offset inwardly in the direction of the x-axis toward the geometric center of the cutting insert with respect to the second cutting edge plane, the geometric center of the cutting insert being a point of intersection of the x-, y- and z-axes.

10. The cutting insert as claimed in claim 9, wherein the first main side surface has a first and a second rake face, wherein the first rake face extends between the first main cutting edge and the first main bearing surface, wherein the second rake face extends between the second main cutting edge and the first main bearing surface, wherein the second main side surface has a third and a fourth rake face, wherein the third rake face extends between the fourth main cutting edge and the second main bearing surface, wherein the fourth rake face extends between the third main cutting edge and the second main bearing surface, and wherein each of the four rake faces is oriented transversely to the x-axis.

11. The cutting insert as claimed in claim 1, wherein the first secondary side surface has a first secondary bearing surface which extends orthogonally to the y-axis and is offset inwardly in the direction of the y-axis toward a geometric center of the cutting insert with respect to the first and the third one of the four first protrusions, and wherein the second secondary side surface has a second secondary bearing surface which extends orthogonally to the y-axis and is offset inwardly in the direction of the y-axis toward the geometric center of the cutting insert with respect to the second and the fourth one of the four first protrusions, the geometric center of the cutting insert being a point of intersection of the x-, y- and z-axis.

12. The cutting insert as claimed in claim 1, wherein each of the four first segmental cutting edges is provided as a corner radius or bevel.

13. A cutting insert for a tool for machining a workpiece, comprising:

two identical mutually opposite base surfaces, wherein at least a part of each base surface is orthogonal to a z-axis of the cutting insert, two identical mutually opposite main side surfaces which extend between the two base surfaces, wherein at least a part of each main side surface is oriented orthogonally to an x-axis of the cutting insert, and two identical mutually opposite secondary side surfaces which extend between the two base surfaces, wherein at least a part of each secondary side surface is oriented orthogonally to a y-axis of the cutting insert, wherein the x-, y- and z-axes are main axes of the cutting insert that are oriented orthogonally to one another, wherein between each one of the base surfaces and each one of the main side surfaces a main cutting edge is arranged, and wherein each main side surface has two diagonally opposite first segmental cutting edges, wherein each first segmental cutting edge adjoins a first end of the respective main cutting edge, wherein the main cutting edges and the first segmental cutting edges of each main side surface are each located in a cutting edge plane which extends orthogonally to the x-axis, wherein the first segmental cutting edges are each arranged on a first protrusion which is arranged on each of the secondary side surfaces and defines a first clearance angle, wherein a secondary cutting edge that extends in a rectilinear manner adjoins each first segmental cutting edge, wherein each secondary cutting edge is arranged at the transition between the respective main side surface and the respective secondary side surface; and wherein each secondary cutting edge encloses a second clearance angle with a parallel to the z-axis in the respective cutting edge plane.

14. A tool for machining a workpiece, in particular for tangential milling, having a tool holder which has at least one cutting-insert receptacle in which a cutting insert is releasably fastened, wherein the cutting insert has three main geometrical axes, an x-axis, a y-axis, and a z-axis, which are oriented orthogonally to one another, wherein the cutting insert has a 180° rotational symmetry about the x-axis, about the y-axis and about the z-axis, respectively, and wherein the cutting insert comprises:

a first and a second base surface which are arranged mutually opposite to one another, wherein at least a part of each of the first and the second base surface is oriented orthogonally to the z-axis;

a first and a second main side surface which are arranged mutually opposite to one another and extend between the two base surfaces, wherein at least a part of each of the first and the second main side surface is oriented orthogonally to the x-axis;

a first and a second secondary side surface which are arranged mutually opposite to one another and extend between the two base surfaces, wherein at least a part of each of the first and the second secondary side surface is oriented orthogonally to the y-axis;

four main cutting edges, wherein a first one of the four main cutting edges is arranged between the first base surface and the first main side surface, a second one of the four main cutting edges is arranged between the second base surface and the first main side surface, a third one of the four main cutting edges is arranged between the second base surface and the second main side surface, and a fourth one of the four main cutting edges is arranged between the first base surface and the second main side surface;

four first segmental cutting edges, wherein a first and a second one of the four first segmental cutting edges are arranged in diagonally opposite corners of the first main side surface, a third and a fourth one of the four first segmental cutting edges are arranged in diagonally opposite corners of the second main side surface, and wherein the first one of the first segmental cutting edges adjoins a first end of the first main cutting edge, the second one of the first segmental cutting edges adjoins a first end of the second main cutting edge, the third one of the first segmental cutting edges adjoins a first end of the third main cutting edge, and the fourth one of the first segmental cutting edges adjoins a first end of the fourth main cutting edge;

four secondary cutting edges, each of which extends in a rectilinear manner and adjoins one of the four first segmental cutting edges, respectively, wherein a first one of the four secondary cutting edges is arranged at a transition between the first main side surface and the first secondary side surface, a second one of the four secondary cutting edges is arranged at a transition between the first main side surface and the second secondary side surface, a third one of the four secondary cutting edges is arranged at a transition between the second main side surface and the first secondary side surface, and a fourth one of the four secondary cutting edges is arranged at a transition between the second main side surface and the second secondary side surface;

four first protrusions, wherein a first and a third one of the four first protrusions are arranged in diagonally opposite corners of the first secondary side surface, wherein a second and a fourth one of the four first protrusions are arranged in diagonally opposite corners of the second secondary side surface, and wherein each of the first protrusions defines a first clearance angle;

wherein the first and the second main cutting edges and the first and the second one of the first segmental cutting edges are arranged in a first cutting edge plane, wherein the third and the fourth main cutting edges and the third and the fourth one of the first segmental cutting edges are arranged in a second cutting edge plane, wherein the first and the second cutting edge planes are parallel to one another and extend orthogonally to the x-axis;

wherein each of the first segmental cutting edges is arranged on one of the four first protrusions, respectively; and wherein each secondary cutting edge encloses a second clearance angle with a parallel to the z-axis.

15. The tool as claimed in claim 14, wherein the cutting insert is arranged in the at least one cutting-insert receptacle in a manner twisted through a defined cutting edge twist angle about a radial direction of the tool holder, such that the main cutting edge used for machining encloses this cutting edge twist angle with a plane that is defined by the radial direction and a rotation axis of the tool holder.

* * * * *